United States Patent [19]

Bursztejn et al.

[11] Patent Number: 5,697,057
[45] Date of Patent: Dec. 9, 1997

[54] CONTROL STATION FOR A SECTORIZED CELL OF A MOBILE RADIO NETWORK

[75] Inventors: Jacques Bursztejn, Paris; Alain Chiodini, Boulogne; Vinod Kumar, Paris, all of France

[73] Assignee: Alcatel Mobile Communication France, Paris, France

[21] Appl. No.: 447,546

[22] Filed: May 24, 1995

[30] Foreign Application Priority Data

May 25, 1994 [FR] France ................... 94 06323

[51] Int. Cl.[6] ................................................ H04Q 7/36
[52] U.S. Cl. ....................... 455/33.3; 455/56.1; 455/62; 455/63
[58] Field of Search ............... 455/33.1, 33.2, 455/33.3, 33.4, 54.1, 56.1, 63, 34.1, 34.2, 67.1, 62; 379/59, 60

[56] References Cited

U.S. PATENT DOCUMENTS

| | | | |
|---|---|---|---|
| 4,144,496 | 3/1979 | Cunningham et al. | 455/33.4 |
| 5,212,830 | 5/1993 | Miller | 455/33.1 |
| 5,561,842 | 10/1996 | Ritter et al. | 455/34.1 |

FOREIGN PATENT DOCUMENTS

| | | |
|---|---|---|
| 0531090A2 | 3/1993 | European Pat. Off. . |
| 2230126 | 12/1974 | France . |
| WO9310601 | 5/1993 | WIPO . |

OTHER PUBLICATIONS

Patent Abstracts of Japan, vol. 12, No. 293 (E–654) 10 Aug. 1988 & JP–A–63 –070 622 (N.T.T.) 30 Mar. 1988.

*Primary Examiner*—Nguyen Vo
*Attorney, Agent, or Firm*—Sughrue, Mion, Zinn, Macpeak & Seas, PLLC

[57] ABSTRACT

A sectorized cell of a mobile radio network forms a first set which comprises a nucleus and a plurality of sectors disposed around the nucleus, the coverage of the cell being provided by transceiver units forming a second set, the first and second sets being associated on a one-to-one basis. Each sector comprising a core, at least one separation section being provided between the cores of two adjacent sectors, and the control station comprises an allocation unit capable of allocating the same resource to the cores of two adjacent sectors.

9 Claims, 2 Drawing Sheets

CONTROL STATION FOR A SECTORIZED CELL OF A MOBILE RADIO NETWORK

BACKGROUND OF THE INVENTION

1. Field of the Invention

The present invention concerns a control station for a sectorized cell of a mobile radio network.

2. Description of the Prior Art

A cellular network in which a geographical territory to be served by the network is divided into cells will be used as an example of such networks. This type of network has the advantage that the same radio resource can be used in two separate cells provided that they are not adjacent.

However, it is desirable to minimize the number of resources required in a given cell to handle a given traffic. An approach similar to that which led to the transition from a conventional network (with no re-use of resources) to a cellular network leads naturally to considering re-use of the resources allocated to a cell within the same cell. The cell must then be divided into zones such that the same resource is not used in two adjacent zones, as always with the constant concern to avoid interference.

French patent application FR-A-2 230 126 describes one solution that can be applied to frequency division multiple access (FDMA) networks. It entails dividing the circular cell into a disk concentric with the cell and a ring whose inside radius is equal to the radius of the disk and whose outside radius is equal to that of the cell. This ring is further divided into equal sectors delimited by radii of the cell. The interior disk of the cell is called the nucleus.

The following rules govern the allocation of resources (frequencies in this instance). The resources are divided into three groups such that any resource is in only one group. There is an even number of sectors and the sectors are numbered consecutively so that sector r is between sectors (r−1) and (r+1). The first frequency group is allocated to the nucleus, the second to the odd numbered sectors and the third to the even numbered sectors. This guarantees that there is no interference within the cell.

To re-use the same resource n times (in n sectors) it would seem necessary to provide 2n sectors, which will increase the amount of equipment required to handle the traffic in a sector, in particular the transceiver units.

Patent application WO 93/10601 describes a cell comprising a first pattern of sectors covering all of the cell. If the same resource must be used in two adjacent sectors, a problem arises if the destination of that resource is the boundary between those two sectors. A separation section is therefore defined between the two sectors. More generally, separation sections cover the boundaries between all the sectors of the first pattern. These separation sections define a second pattern of sectors with an angular offset relative to the first pattern.

However, whether it is part of the first pattern or the second pattern, each sector has its own transceiver unit. It follows that this is broadly equivalent to the method described in the previous prior art document.

An object of the present invention is therefore a sectorized cell, a control station for said cell and a method of allocating resources in said cell which substantially reduces the number of equipment required for re-use of a given resource.

SUMMARY OF THE INVENTION

To this end, in accordance with the invention, the cell forming a first set which comprises a nucleus and a plurality of sectors disposed around said nucleus, the coverage of said cell being provided by transceiver units forming a second set, the first and second sets being associated on a one-to-one basis, each sector comprising a core, there being at least one separation section between the cores of two adjacent sectors, the control station comprises an allocation unit capable of allocating the same resource to the cores of said two adjacent sectors.

Subject to certain precautions, it is therefore possible to re-use the same resource in two adjacent sectors, with the result that the same resource can be used a number of times equal to the number of sectors.

The cell comprising two separate separation sections, one on either side of the core of a reference sector, said allocation unit is advantageously capable of allocating the same resource to said two sections.

It follows that the area in which resource re-use is possible is equivalent to the whole of the ring.

Moreover, said allocation unit is adapted to allocate separate resources to a separation section and to the cores adjacent said separation sections.

This guarantees that the level of interference is reduced to an acceptable level.

Also, said control station comprises a signalling unit for distributing the same signalling resources in a sector and in a portion of the nucleus defined by the extension of said sector.

Further, the control station comprises a location unit associated with said signalling unit to estimate the radial position of said terminal on the basis of a signalling resource used by the terminal in order to determine if it is in the sector or in the nucleus portion.

Additionally, the terminal being logged on in said sector, said sector comprising a front border and/or a rear border, the location unit is further adapted to estimate the angular position of said terminal in order to determine if it is located in the front border, in the core or in the rear border of the sector.

To this end, the transceiver unit of a sector comprising an array of conformable and steerable beam antennas disposed at the centre of the cell, the control station comprises a control unit for controlling said transceiver unit so that:

either the beam has a wide angle corresponding to that of the sector to convey the signalling resources to enable location of the terminal, or the beam has a narrow angle to direct the traffic resources into one of the two borders or into the core.

The invention will find one application in a time division multiple access cellular digital mobile radio network in which separate signalling resources are allocated to each sector.

The invention also provides a method of allocating resources in a mobile radio cell comprising a nucleus surrounded by a plurality of sectors, said nucleus and all the sectors being each associated with its own transceiver unit, each sector comprising a core, at least two separation sections, one on either side of the core of a reference sector, in which method:

a resource can be allocated to the nucleus if it is not used in any of the sectors, a resource can be allocated to the core of the reference sector if it is already in use outside a first interference zone comprising the nucleus and the two separation sections adjacent said core, and a resource can be allocated to a separation section if it is already in use outside a second interference zone comprising the nucleus and two cores adjoining said separation section.

The present invention will now be explained through a description of one embodiment of the invention given by way of example with reference to the appended drawings.

DETAILED DESCRIPTION OF THE INVENTION

Items shown in both figures carry the same reference number in both figures.

This embodiment of the invention will be described in connection with time division multiple access (TDMA) cellular mobile radio networks, such as so-called GSM or like networks. In these networks the term "cell" has a precise accepted meaning: a territory is divided into cells and the same resource cannot be used simultaneously in two adjacent cells.

In the context of the invention, the term "cell" refers only to a coverage area of the network, independently of the environment of the cell, i.e. whether it is surrounded by other cells or not. The cell is characterized by the resources that it can use.

TDMA networks use carrier frequencies divided into successive frames. A frame is in turn divided into consecutive time slots. A resource therefore corresponds to one time slot of a specific carrier. If frequency hopping is employed, a resource corresponds to a time slot combined with a frequency plan identifying the carrier in time. The invention naturally applies to networks using frequency hopping and networks which do not use it, but applies independently of the type of resource. It applies to FDMA systems, for example.

Figure 1:
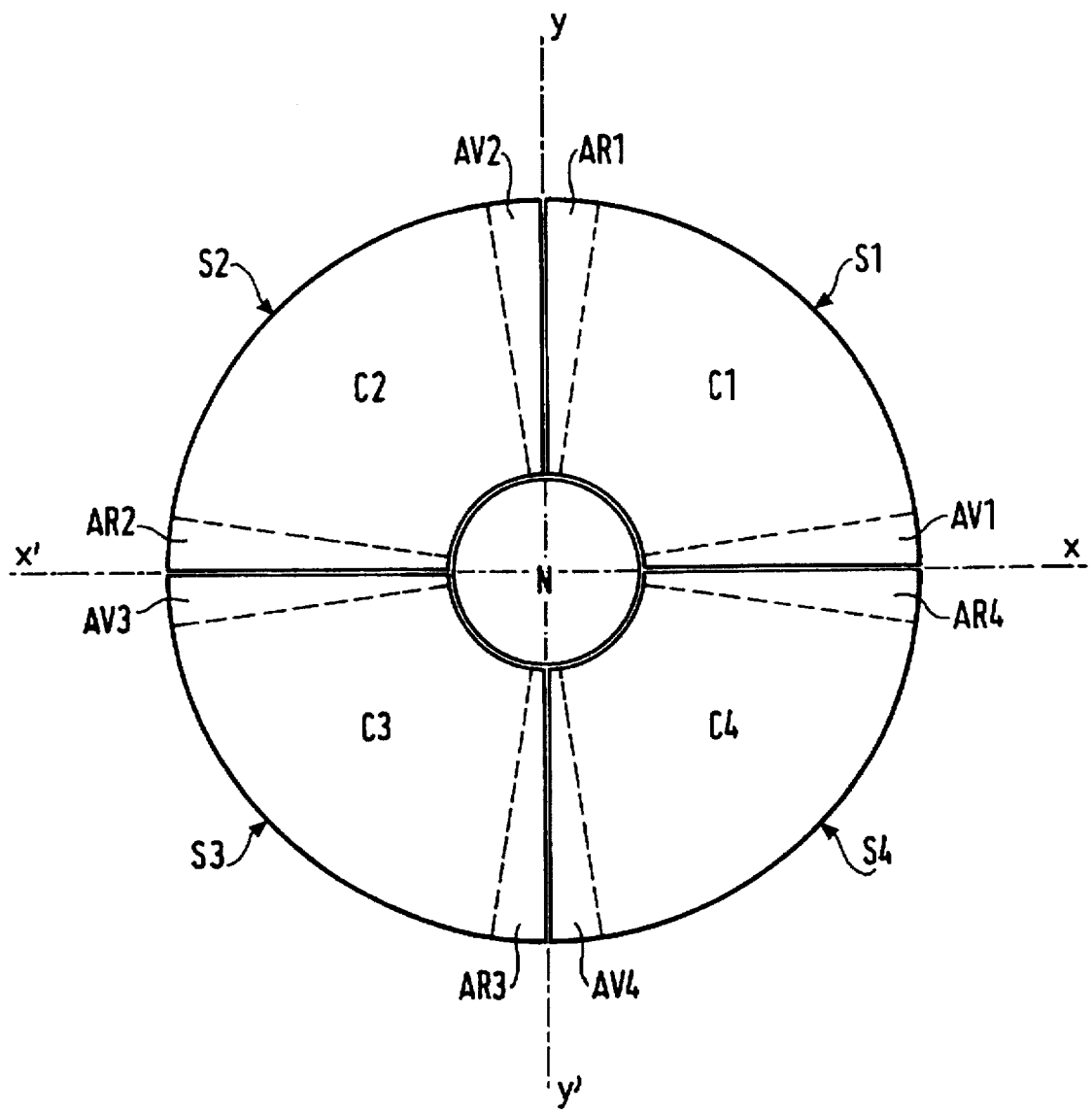
FIG. 1 shows a sectorized cell in accordance with the invention.

The sectorized cell of the invention is shown diagrammatically in FIG. 1 with a substantially circular shape, for reasons of simplicity. It goes without saying that the familiar hexagonal shape used to represent cellular networks could equally well have been used.

The cell comprises a nucleus N in the form of an inner disk concentric with the cell. It also comprises a peripheral ring whose inside radius is equal to the radius of the nucleus and whose outside radius is equal to that of the cell.

The ring as shown is divided into four equal parts called sectors. These sectors are delimited by two axes x'x, y'y of the cell at 90° to each other.

The horizontal and vertical axes in FIG. 1 therefore define four quadrants, the first top right, the second top left, the third bottom left and the fourth bottom right.

The first sector S1, disposed in the first quadrant, comprises a front border AV1 delimited by the axis common to the first and fourth quadrants and by a radius of the cell in the first quadrant relatively close to this axis. It also comprises a rear border AR1 delimited by the axis common to the first and second quadrants and by a radius of the cell in the first quadrant relatively close to this axis. It finally comprises a core C1 between the front border AV1 and the rear border AR1.

The second sector S2, third sector S3 and fourth sector S4 are exactly the same shape as the first sector S1, in this example, and so each comprises a respective front border AV2, AV3, AV4, a respective core C2, C3, C4 and a respective rear border AR2, AR3, AR4.

The dimensions of the sectors are chosen in accordance with the usual rules in the art to prevent any risk of interference. Thus a pair of adjacent borders, for example the rear border AR1 of the first sector and the front border AV2 of the second sector, have dimensions which reduce to an acceptable level interference between the two cores adjacent it, namely the core C1 of the first sector and the core C2 of the second sector in this case.

Figure 2:
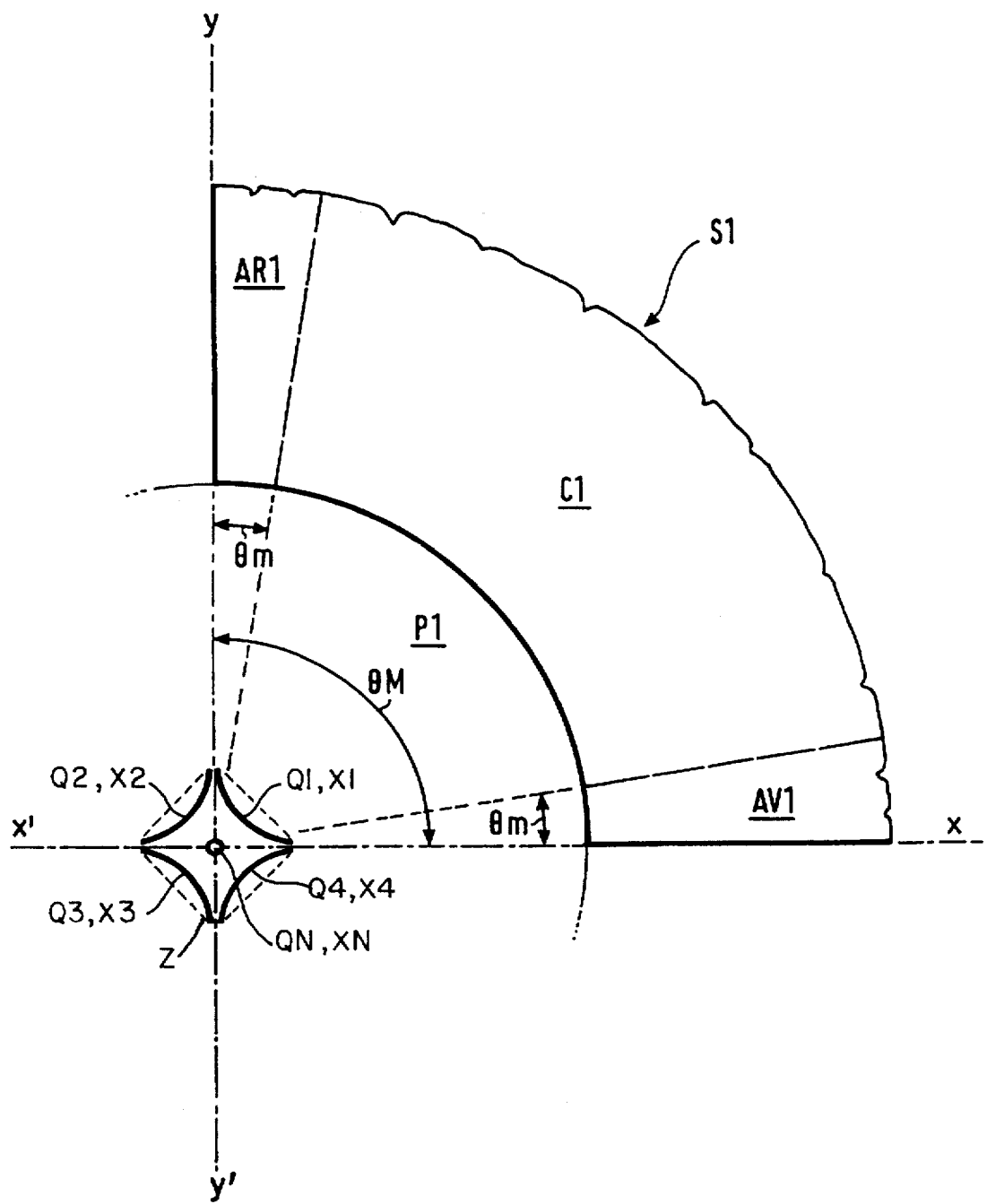
FIG. 2 shows an array of antennas for implementing the invention.

This cell advantageously uses a set of antennas disposed at the centre of the nucleus N (see FIG. 2).

There is an omnidirectional antenna QN and, for each quadrant, a transceiver's antenna array Q1, Q2, Q3, Q4. The respective transceiver units are represented as X1, X2, X3, X4, and XN. The first antenna array Q1 assigned to the first quadrant is a conformable and steerable beam array familiar to the person skilled in the art.

The beam is conformable in the sense that its aperture angle can be varied, it being understood that the maximal angle $\theta_M$ is substantially equal to that of the quadrant and that the minimal angle $\theta_m$ is substantially equal to that of a border AV1, AR1. The beam is steerable so that it can cover all of the first quadrant or one of the two borders AV1 or AR1 or the core C1. Note that the core C1 can be covered entirely by a beam of angle $(\theta_M - 2\theta_m)$ or by scanning a beam with a small angle.

Note also that a steerable zero antenna could be used in some cases to prevent interference between the nucleus and a sector. However, this type of antenna does not constitute a general solution to the problem.

Although conformable and steerable beam arrays represent one advantageous embodiment of the invention, it should be noted that the same result can be obtained by other means.

For example, if $\theta_M = t\theta_m$, an alternate solution is to use t unidirectional antennas of angle $\theta_m$ arranged to cover all of the quadrant. It is equally feasible to use a directional antenna of angle $\theta_m$ for each of the borders AV1 and AR1 and a unidirectional antenna of angle $(\theta_M - 2\theta_m)$ for the core C1. Given the diversity of possible configurations, a general formulation of the requirement is that a transceiver unit can serve a quadrant or the nucleus.

The second, third and fourth antenna arrays Q2, Q3, Q4 respectively assigned to the second, third and fourth quadrants are arranged in those quadrants in the same manner as the first array Q1 is arranged in the first quadrant. For this reason these arrangements are not described in detail.

The operation of the cell will now be described with reference to the GSM system. A distinction is therefore drawn between the signalling resources needed to set up a call and the traffic resources which convey the calls when set up.

A control station 2 for the cell controls the omnidirectional antenna QN, the four antenna arrays Q1, Q2, Q3, Q4 and the associated equipment.

Signalling in one quadrant, for example the first quadrant, is handled by the corresponding antenna array, the first antenna array Q1 in this case. Remember that the quadrant comprises the sector S1 and the portion P1 of the nucleus N adjacent that sector and delimited by the half-axes defining the quadrant.

Traffic in the nucleus is handled by the omnidirectional antenna QN and traffic in each sector is handled by the corresponding antenna array.

Assume that a terminal is present in the first quadrant.

The control station 2 comprises a location unit which determines if the terminal is in the nucleus portion P1, the front border AV1, the core C1 or the rear border AR1. Connected to the antenna array Q1 of the first quadrant, this location unit first estimates the distance of the terminal from the center of the cell.

A simple method which can be used in the GSM system entails using signalling information which is already provided in the GSM system. The signalling transmitted to a terminal includes a timing advance which the terminal must use for transmission. The timing advance is directly related to the distance to the terminal since it is approximately equal to the time needed for the control station to transmit a first signal to the terminal, for the terminal to process the first signal and transmit a second signal acknowledging its reception to the first antenna array Q1 and for its reception by the control station.

Thus if the timing advance is above a predetermined threshold the terminal is in the first sector S1 whereas otherwise the terminal is in the nucleus portion P1 facing that sector. Given current technological constraints, it is possible to define a nucleus N whose minimal radius is in the order of 300 meters.

Another method entails measuring the attenuation of a signal transmitted by the terminal, which can be done from a knowledge of the transmit power and by measuring the power at which the signal is received by the antenna array.

The invention naturally applies regardless of the method employed to estimate the distance.

If the terminal is in the first sector S1, it is still necessary to determine whether it is in the front border AV1, the core C1 or the rear border AR1 of the sector. For this reason the location unit includes means for sensing the angular location of the terminal. These means analyze the signal received at the first antenna array Q1 from the terminal in order to estimate the angle of arrival of the signal. This technique is known to the person skilled in the art and therefore need not be described further.

The location process is obviously the same in each sector.

Consider now the problem of allocating traffic resources.

A first solution is to adopt a static allocation, i.e. to provide three groups of resources, each resource belonging to only one group. The first group is assigned to the nucleus, the second to the cores and the third to the borders. In this case, to assign a resource to a terminal, it is sufficient to choose an available resource from the group corresponding to the location of the terminal. This first solution is evidently not optimized in respect of resource utilization.

A second solution is to divide the resources into two groups, the first assigned to the nucleus and the second to all the sectors. In this case, for the nucleus, it is sufficient to select an available resource from the first group, as before. For the core C1 of the first sector it is necessary to select a resource from the second group which is not being used in an interference zone comprising the front border AV1 of the sector S1, the rear border AR4 of the preceding sector S4, the rear border AR1 of the first sector and the front border AV2 of the next sector S2. In one of the two borders of a pair comprising the rear border AR1 of the first sector and the front border AV2 of the second sector, it is necessary to select a resource from the second group which is not being used in an interference zone comprising the cores C1, C2 of the first and second sectors and the other border of the pair. It is a simple matter to generalize this method to cover all of the sectors.

A third and particularly advantageous solution is to use dynamic allocation of resources. For example, a table can be drawn up comprising one row per resource and one column for each element of the cell, i.e. one for the nucleus, one for each pair of adjacent borders and one for each core. When the ith resource is being used in the jth element, a flag (e.g. a bit) is set at the intersection of the ith row and the jth column of the table. The allocation method is as follows:

In the nucleus, a resource can be allocated if it is available, i.e. if it is not being used in any of the elements of the cell.

In a core Ck, a resource can be allocated if is not being used in the core, in the nucleus N, in the pair of borders ARk−1, AVk preceding it, or in the pair of borders ARk, AVk+1 following it, even if it is being used elsewhere in the cell.

In a pair of adjacent borders ARk, AVk+1, a resource can be allocated if it is not being used in this pair ARk, AVk+1, in the nucleus N, in the core Ck which precedes it or in the core Ck+1 which follows it.

Now that the allocation of resources has been explained, it is necessary to consider what happens when a terminal crosses the frontier between any two elements of the cell.

When the terminal leaves the nucleus and enters one of the sectors the transceiver unit it is using must be changed accordingly. The same resource can be retained or a different resource can be allocated in accordance with the rules previously established.

When the terminal leaves the front border AV1 of a sector and enters the core C1 of that sector, the same resource can only be retained if it is not being used in the pair of borders AR1, AV2 including the rear border AR1 of that sector. Otherwise, the resource must be changed in accordance with the rules previously explained. An alternative is to change resource in any event.

When the terminal leaves the rear border AR1 of one sector to enter the core C1 of that sector, the same resource can only be retained if it is not being used in the pair of borders AR4, AV1, including the front border AV1 of that sector. Otherwise the resource must be changed in accordance with the rules previously established. An alternative is to change resource in any event.

When the terminal leaves a border AR1 and enters the adjacent border AV2, the transceiver unit it is using must be changed accordingly. Either the same resource is retained or a different resource is allocated in accordance with the rules previously established.

When the terminal leaves the core of a sector and enters a border, the same resource can only be retained if it is not being used in the core of the sector adjacent that border. Otherwise the resource must be changed in accordance with the rules previously established. An alternative is to change resource in any event.

When the terminal leaves a sector and enters the nucleus, the transceiver unit it is using must be changed accordingly. Either the same resource is retained or a different resource is allocated in accordance with the rules previously established.

It goes without saying that the allocation table is updated each time a resource is changed, whether the resource is released, changes cell element or is allocated again.

Note that this solution offers the greatest flexibility in terms of resource allocation. It also minimizes the number of resource changes for a terminal moving within the cell. This is an advantage because these intracell handover procedures represent a heavy penalty in terms of network management.

The embodiment of the invention described with reference to the figures is given by way of example only. The invention applies in many other cases.

Firstly, the invention can be used in only two adjacent sectors if it is preferable to retain some other type of operation in the other sectors.

Secondly, the invention is independent of the number of sectors (two sectors minimum) and their dimensions. A sector can have any size, likewise its core, providing that the rules previously established are complied with.

Thirdly, the invention is not tied to the type of signalling adopted. GSM networks which impose constraints on allocation of signalling resources have been chosen to demonstrate the application of the invention.

Finally, a further comment is appropriate on the subdivision of the various sectors. For reasons of symmetry and to clarify the description, each sector has been divided into a front border, a core and a rear border, the two borders being substantially the same size.

The person skilled in the art will realize that the size of the borders can be varied provided that a pair of adjacent borders has sufficient size in relation to possible interference between the two cores adjacent the pair. For example, considering the pair comprising the rear border AR1 of the first sector S1 and the front border AV2 of the second sector S2, said rear border AR1 can be made smaller, to the point of eliminating it entirely, provided that said front border AV2 is enlarged accordingly. A pair of adjacent borders defines a separation section which must include the separation limit between the two sectors comprising those borders, this separation limit being inside or at one end of the separation area.

It is even possible for a particular sector to have no border at all if the two adjacent sectors each comprise a border adjacent to that sector. For example, the front and rear borders AV1, AR1 of the first sector S1 can be eliminated provided that the front border AV2 of the second sector S2 and the rear border AR4 of the fourth sector S4 are retained and are sized accordingly.

To summarize, application of the invention is essentially subject to the following two rules:

the transceiver unit must be changed when the terminal moves from the nucleus to a sector, from a sector to the nucleus or from a sector to another sector;

a resource which is already being used in any element adjacent that in which the terminal is located must not be allocated and a resource which is already being used in any element towards which the terminal is moving must not be retained.

There is claimed:

1. Control station for a sectorized cell of a mobile radio network, said cell forming a first set which comprises a nucleus and a plurality of sectors disposed around said nucleus, the coverage of said cell being provided by transceiver units forming a second set, said first and second sets being associated on a one-to-one basis, each sector comprising a core, and at least one separation section being provided between said cores of two adjacent sectors, said control station comprising an allocation unit capable of allocating the same resource for use in said cores of said adjacent sectors at the same time.

2. Control station according to claim 1 wherein, said cell comprising two separate separation sections on either side of said core of a reference sector, said allocation unit is capable of allocating the same resource to said two sections.

3. Control station according to claim 1 wherein said allocation unit is adapted to allocate separate resources to a separation section and to said cores adjoining said separation section.

4. Control station according to claim 1 comprising a signalling unit for distributing the same signalling resources in a sector and in a portion of said nucleus defined by the extension of said sector.

5. Control station according to claim 4 comprising a location unit associated with said signalling unit for estimating the radial position of a terminal on the basis of a signalling resource used by said terminal in order to determine if it is in said sector or in said portion of said nucleus.

6. Control station according to claim 5 wherein said terminal being logged on in said sector, and said sector comprising a front border and/or a rear border, said location unit is also adapted to estimate the angular position of said terminal in order to determine if it is in said front border, said core or said rear border of said sector.

7. Control station according to claim 6, said transceiver unit of a sector comprising an array of conformable and steerable beam antennas, for generating a conformable, steerable beam, disposed at the center of said cell, comprising a control unit for controlling said transceiver unit so that:

either said beam has a wide angle corresponding to that of said sector for conveying signalling resources enabling location of said terminal, or said beam has a narrow angle to direct traffic resources into one of said two borders or into said core.

8. Use of the control station according to claim 1 in a time division multiple access cellular digital mobile radio network in which separate signalling resources are allocated to each sector.

9. Method of allocating resources in a mobile radio cell, said cell comprising a nucleus surrounded by a plurality of sectors, said nucleus and all said sectors being each associated with its own transceiver unit, wherein, each sector comprising a core, and at least two separation sections being provided on either side of said core of a reference sector, a resource can be allocated to said nucleus if it is not being used in any of said sectors, a resource can be allocated to said core of said reference sector if it is already being used outside a first interference zone comprising said nucleus and said two separation sections adjacent said core, and a resource can be allocated to a separation section if it is already being used outside a second interference zone comprising said nucleus and two cores adjacent said separation section.

* * * * *